Figure 1:
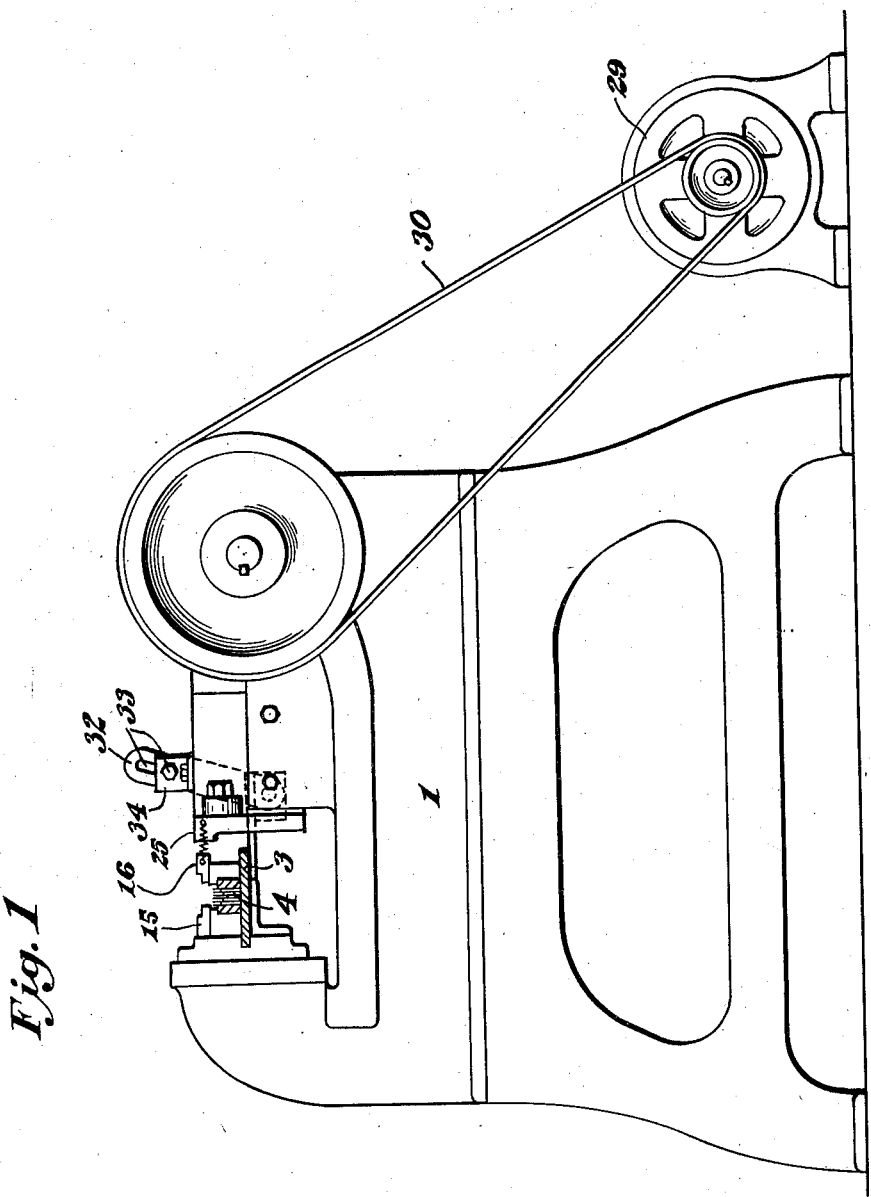

Feb. 3, 1931.  H. HUEBER  1,791,085
METHOD AND MACHINE FOR FORMING WINDSHIELD CLEANER BLADES
Filed Dec. 31, 1927  4 Sheets-Sheet 1

Inventor
Henry Hueber
by Barton A. Bean
Attorney

Feb. 3, 1931. H. HUEBER 1,791,085
METHOD AND MACHINE FOR FORMING WINDSHIELD CLEANER BLADES
Filed Dec. 31, 1927 4 Sheets-Sheet 2

Inventor
Henry Hueber
by Barton A. Beau
Attorney

Feb. 3, 1931. H. HUEBER 1,791,085
METHOD AND MACHINE FOR FORMING WINDSHIELD CLEANER BLADES
Filed Dec. 31, 1927 4 Sheets-Sheet 3

Inventor
Henry Hueber
by Barton A. Bean
Attorney

Feb. 3, 1931. H. HUEBER 1,791,085
METHOD AND MACHINE FOR FORMING WINDSHIELD CLEANER BLADES
Filed Dec. 31, 1927   4 Sheets-Sheet 4
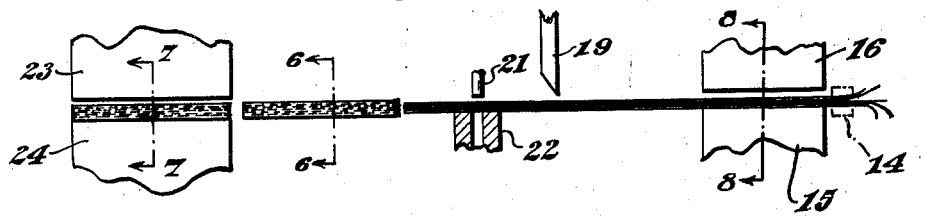
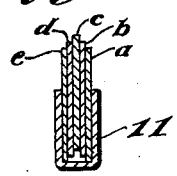 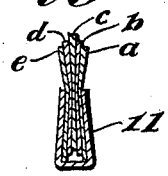
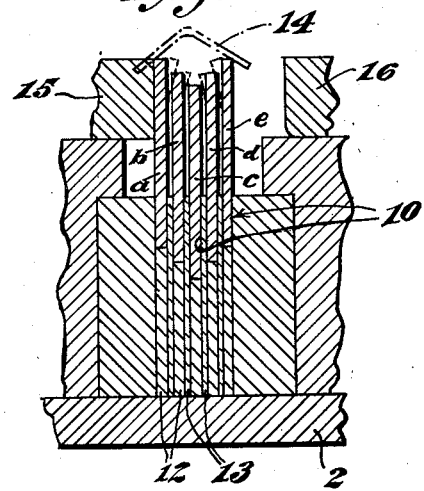 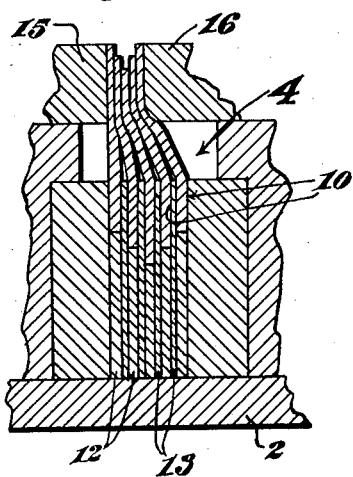
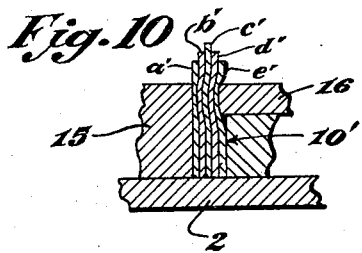
Inventor
Henry Hueber
by Barton A. Bean Jr.
Attorney Patented Feb. 3, 1931

1,791,085

UNITED STATES PATENT OFFICE

HENRY HUEBER, OF BUFFALO, NEW YORK, ASSIGNOR TO TRICO PRODUCTS CORPORATION, OF BUFFALO, NEW YORK

METHOD AND MACHINE FOR FORMING WINDSHIELD-CLEANER BLADES

Application filed December 31, 1927. Serial No. 243,926.

This invention relates to a method and machine for forming windshield cleaner blades with particular reference to multi-ply blades or those having a plurality of wiper strips secured in a common holder.

There has recently been developed a windshield cleaner blade of a multi-ply construction in which the plies have individual contact with the windshield glass to produce a better wiping action thereacross. Considerable difficulty has been experienced in developing a machine for associating and arranging the plies in the holder or backing strip which is usually U-shaped in cross section and has its side walls pressed against the interposed ply structure to clampingly embrace the same and secure it against unauthorized dislodgement therefrom.

The invention has for an object to provide a method of associating and securing a plurality of plies in a predetermined order whereby the application of a holder thereto will be facilitated.

The invention further resides in the method of associating and temporarily securing a plurality of plies in a predetermined order and subsequently applying a holder thereto for permanently securing the associated order of plies.

The invention has for further objects the provision of a machine by which a multi-ply unit is obtained; to provide a machine in which the different plies of the unit are arranged in a predetermined order for subsequent placement in a holder; to provide a machine wherein a predetermined order of plies are temporarily secured in a unitary structure for subsequent placement in a holder wherein the associated relation of plies is permanently secured; to provide a machine in which multi-ply units or structures are produced in an economical manner; and to provide a machine for temporarily attaching a plurality of strips in a predetermined order, subsequently severing a predetermined length of the laminated strip body into wiper blade ply units, and finally, operating on such unit while the individual plies remain temporarily secured together.

Figure 2:
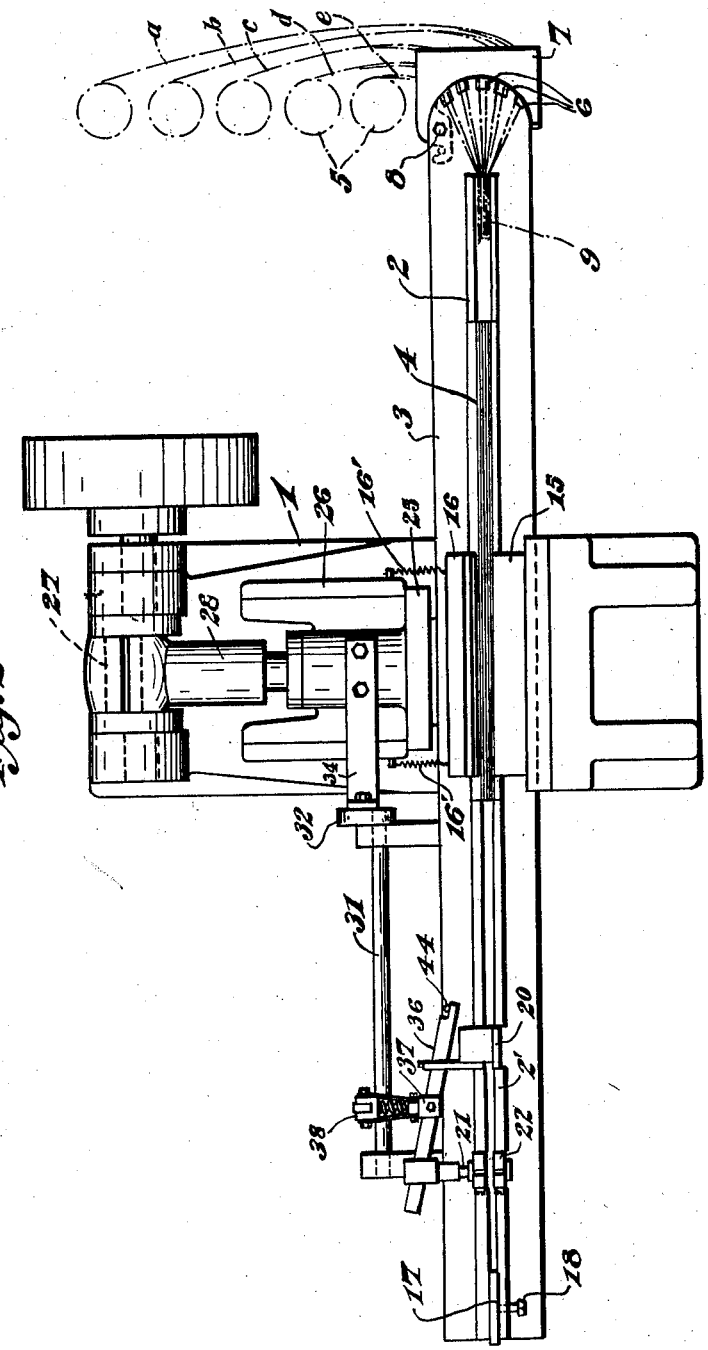
Figure 3:
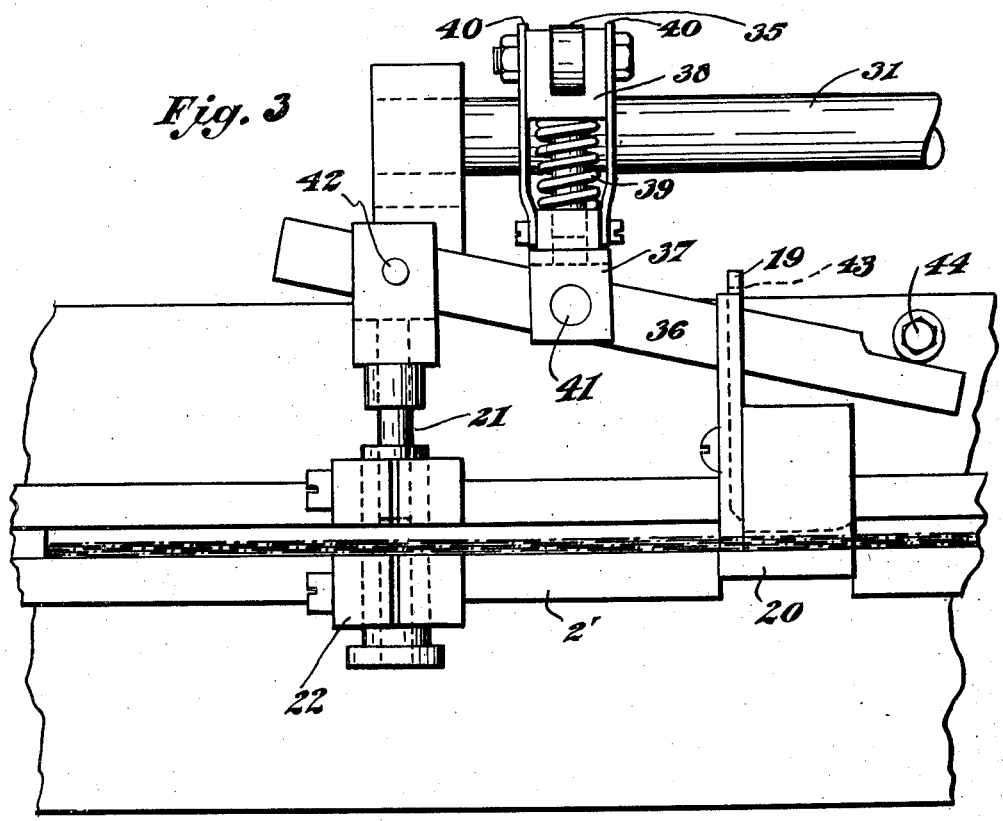
Figure 4:
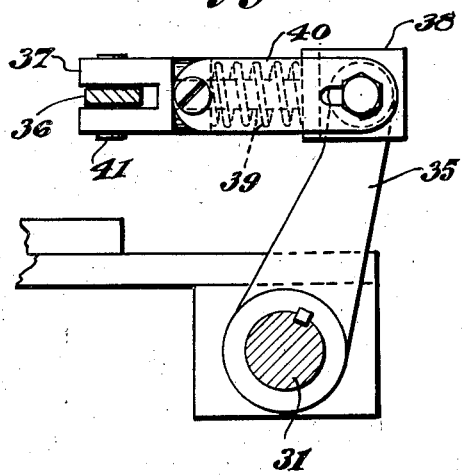

The invention further resides in the salient features of construction, the arrangements and combinations of parts, and the steps and sequence of steps hereinafter described and claimed, reference being had to the accompanying drawings wherein, Fig. 1 is an end elevation of the improved machine, Fig. 2 is a top plan view thereof, Fig. 3 is an enlarged, fragmentary view in top plan, of the unit severing and punching mechanism, Fig. 4 is a detailed, sectional view illustrating the take-up link mechanism, Fig. 5 is a schematic showing of the several operations and steps involved in forming the multi-ply blades, Fig. 6 is a detailed, sectional view showing one of the multi-ply units preliminarily disposed in the holder or backing strip, such as would appear about at line 6—6 in Fig. 5, Fig. 7 is a similar view about on line 7—7 showing the unit clamped in the holder, Fig. 8 is a transverse section through the strip-attaching or securing means, as would appear about on line 8—8 of Fig. 5, showing the strips in their associated relation preliminary to being secured together, Fig. 9 is a similar view showing the strips being secured together, and Fig. 10 illustrates a slightly modified arrangement of strips and the manner of securing the same.

Referring more in detail to the accompanying drawings, the numeral 1 designates the machine having a guideway 2 extending lengthwise of the bed 3. Within the guideway, at a suitable point therein, is provided the strip-associating means or device which functions to arrange or relate a plurality of strips in a predetermined order, which order is desired among the plies of a finally completed multi-ply cleaner or wiper blade. The strips are preferably of rubber although one or more of them may be of a textile fabrication, and these strips are fed from a supply such as indicated at 5, there being five supplies herein shown from which the five strips a, b, c, d, and e are obtained. These strips are guided through the respective ones of the corresponding numbers of notches 6 provided in the adjacent end of the bed 3, which notches are arranged in the periphery of the arcuate end of said bed and are closed by a guard plate or keeper 7 pivotally mounted on the bed at 8 whereby it may be swung away from the notches to permit ready introduction of the strips into the respective notches and then swung back over the notches for holding the strips therein. As shown, the strips are drawn through the notches or openings 6 flatways and are thence turned on their edges so as to enter the mouth of the guideway 2 upon their edges and in side by side relation, as is indicated at 9. The strips have been terminated short of the associating means in Fig. 2 for the sake of clearness in illustrating the remaining portion of the machine.

The strip-associating device is herein depicted as comprising a series of channels 10 of different depths. The outside channels are preferably of the same depth and are herein depicted as being the shallowest; the next adjacent channels are also preferably of the same depth and are herein depicted as being deeper than the outside channels; while the innermost or central channel is shown as being of the greatest depth; whereby as the strips ride through these channels and find the respective bottoms thereof the upper or projecting edges of the strips will be increasingly offset or stepped, as is clearly shown in Fig. 8. In the present showing these projecting or upper edges of the strips will be capped and enclosed by the U-shaped metal holder 11 (Figs. 6 and 7) and the bottom edges of said strips will constitute the wiping edges of the windshield cleaner blade so that the wiping edges will assume a pyramidal relation with the central ply projecting the greatest distance from the holder 11 and the other plies projecting progressively decreasing distances toward the sides of the holder. The strip-associating means may be practically formed by alternating the gage plates 12 with the partition plates 13, the former having their uppermost edges providing shoulders constituting the bottoms of the channels 10 while the latter extend above the gage plates to clearly define the different channels and thereby separate the strips while being fed therethrough. This complete separation of the strips facilitates their finding of the bottoms of the respective channels by gravity since the rubber strips have less frictional contact with the metal partitions 13 than with each other. If desired, a guard member, such as is indicated at 14, may rest or be superimposed upon the upper edges of the strips for retaining them on the bottoms of their channels. This guard may be in the form of an angle plate which will rest upon the upper edges of the outermost strips and flex the same inwardly against the inner strips so as to hold them also within their channels. The associating means is preferably of a length sufficient to arrange and maintain the strips in the predetermined order until the functioning of the strip-attaching means which temporarily secures the pre-arranged strips in their order to facilitate the application of the holder thereto.

In their lengthwise movement through the channels the strips pass between a die 15 and a punch 16, constituting the strip-securing means. The punch action might produce an interlocking relation between the strips, or might even apply a staple for securing the same together, but in the use of rubber strips it has been found that the strips may be adhesively secured together merely by pressing them together under great force. This is exemplified in Fig. 9 wherein the punch 16 is shown exerting heavy pressure against the strips and the die 15. After the punch has been retracted the upper edges of the strips will adhere together to such an extent as to permit the further operations necessary in the final completion of the wiper blade, such as the punching and severing of the strips into multi-ply units and the application of the holder to the ply structure. This temporary adhesion of the strips might be applied to those edges which will constitute the wiping edges of the wiper since the adhesion may readily be broken upon twisting or flexing the ply structure. Therefore, if the channels are progressively deeper away from the central channel so that the upper edges of the strips will progressively project toward the central strip, as in the blade shown in Fig. 6, said upper edges could still be compressed together as in Fig. 9, the holder applied to the unsecured edges, and then the adhesion between the wiping edges broken immediately upon flexing of said wiping edges. The several channels may be of a common depth and the partition members 13 done away with as is shown at 10' in Fig. 10, and if the stepped contour of the wiping edge of the blade is desired such may be obtained by providing strips a', b', c', d' and e' of varying widths with the central strip possessing the greatest width. Also in this view the punch member is shown acting upon the intermediate portions of the strips for adhesively securing the same together at this point. Referring again to Fig. 9, the action of the punch in bending over the adjacent strips against the remote strips would tend to bring the upper edges of the adjacent strips slightly lower than the upper edges of the remote strips, but the difference is so slight as to be almost negligible. However, to offset this the bottoms of the adjacent channels could be slightly elevated above the bottoms of the corresponding remote channels.

After being temporarily secured together the strips pass out of the associating channels and move as a unity through the delivery end of the guideway 2 to the unit-severing means. Secured within the guideway beyond the cutting means is a stop member 17 which may be adjusted for different length blades, as by a set screw 18. The unit-severing means comprises a cutter blade 19 and a co-operating anvil 20, the latter being adjustably interposed in the guideway for adjustment toward and from a perforating punch 21. The section 2' of the guideway between the perforating punch and the cutter may be replaceable by a different length section to permit adjustment of the cutter toward and from the perforating punch in accordance with the adjustment of the stop 17 so that blade units of different lengths may be centrally perforated by the punch 21.

The metal holder 11 is of channeled formation and the side walls are provided with registering perforations (not shown) through which the rivet or screw is passed in attaching a clip which is in turn connected to the wiper-carrying arm of the windshield cleaner. These registering holes are provided in the holder before the same is applied to the multiply unit and therefore it is desired to have the unit perforated opposite these holes so as to have unobstructed passage from one hole to the other. The unit is therefore preferably perforated at the time it is severed from the stock supply of strip. In effecting this operation the perforating punch 21, on one side of the ply structure, cooperates with the die 22 on the opposite side thereof for punching out a portion of the unit.

Following the severing and punching-out operation of the multi-ply unit, the holder 11 is next applied and compressed to securely clamp the unit therein, such as is indicated in Fig. 7. In compressing the sides of the holder against the interposed ply unit a simple form of press may be used such as is indicated diagrammatically in Fig. 5 wherein the punch 23 cooperates with a fixed die 24. In carrying out this operation it is preferable to lift the unit from the guideway, apply the holder, and then apply the clamping pressure to the sides of said holder. This operation may readily be performed without interference with the remainder of the strip stock since the unit has been severed therefrom. However, this operation might be effected by applying the holder to the unit without removing the unit from the guideway and incorporating the clamping die and punch in the guideway at this point, in which case the stop 17 could be replaced by a gage marking alongside of the guideway.

The strip-securing punch 16 may be operated by a slide 25 which is mounted independently of the punch 16 to reciprocate within the gibs 26 under the action of the crank 27 to which it is connected by means of the pitman or connecting rod 28. The crank 27 is in turn driven from a suitable source of power such as an electric motor 29 to which it is connected as by means of a belt and pulley drive 30. Extending alongside of the bed is a rock shaft 31 having a rocker arm 32 which has a pin-and-slot drive connection 33 with an arm 34 carried by the slide 25, whereby upon reciprocating the slide a rocking movement will be imparted to the rock shaft 31. After the slide has been retracted from the punch 16 the latter is resiliently retracted by means of a pair of springs 16' which are connected at one end to the punch and at the opposite end to a fixed part, such as the gibs 26. A second rock arm 35 is fixed on the rock shaft 31 and its outer end is linked to a lever 36 by means of a take-up link comprising yieldably connected sections 37 and 38 with an interposed expansion spring 39 which tends to hold the sections in distended relation but is limited in such separation of the sections by slotted keepers 40 slidably connecting the sections. The lever 36 is pivoted intermediate its ends to the adjacent end of the take-up link, as indicated at 41, and one end of the lever is pivotally connected to the perforating punch 21, as at 42, while the opposite end of the lever slidably engages in a slot 43 of the cutter blade 19 and extends beyond the latter for engaging a stop pin 44. This slidable connection permits of ready adjustment of the blade 19 toward the punch 21 or replacement thereof. The rocking action of the shaft 31 acts to bodily shift the lever 36, forcing the cutter blade 19 and the perforating punch 21 forwardly into an operative position. The cutter blade is limited in its inward movement by contact with the anvil 20 and after this limit of movement is reached, should the punch not have completed its operation by then, the same will continue its movement through the compensating action of the lever 36. Any additional movement of the rock shaft after the functioning of the cutter and punch will be accommodated by the take-up link, the section 38 advancing against the compression of the spring 39 toward the section 37. Upon retraction of the cutter blade and punch, should the punch stick or lag behind in its movement the opposite end of the lever will contact with the post 44 and fulcrum thereabout in positively retracting said punch. The lever therefore serves in a compensating capacity between the take-up link and the cutter blade and punch.

In operation, the several strips are fed from their respective supplies through the different channels 10 which associates them in a predetermined order or relation following which they are temporarily bound together preferably in a manner which does not disrupt or tear the material of the strips. Thence, the multi-strip stock is fed along as an entity from which the multi-ply units are severed. The unit is here perforated and the holder applied. It is preferable to perforate the unit prior to the application of the holder thereto since the perforation of the unit after the application of the holder would subject the holder to possible injury through improper centering of a perforating punch.

What is claimed is:

1. The method of forming multi-ply wiper blades for windshield cleaners, consisting in feeding lengthwise on edge a plurality of strips, associating said strips in a predetermined order, temporarily securing said strips in their associated order, advancing the bound strips as an entity to a severing device, severing a length of the bound strips to form a multi-ply blade unit, perforating the unit intermediate its ends for registry with the side holes of a holder, and finally applying a holder thereto with the side holes of the holder in registry with the perforated portions of the unit.

2. A method of forming multi-ply wiper blades for windshield cleaners, consisting in feeding a plurality of strips on edge in a longitudinal direction, associating said strips in a predetermined stepped order, temporarily securing said strips in their associated order, severing a length from said secured strips to constitute a multi-ply unit, and applying a holder to the unit.

3. A method of forming multi-ply wiper blades for windshield cleaners, consisting in feeding a plurality of strips on edge in a longitudinal direction, associating said strips in a predetermined stepped order, temporarily securing said strips in their associated order, severing a length from said secured strips to constitute a multi-ply unit, and then in permanently securing the plies of the unit together.

4. A method of forming multi-ply wiper blade units for windshield cleaners, consisting in feeding a plurality of strips on edge through a like number of channels by which the strips are held in a definite order, securing the strips in said order, and severing a length of the secured strips to form a multi-ply blade unit.

5. A method of forming multi-ply wiper blade units for windshield cleaners, consisting in feeding a plurality of strips on edge through a plurality of channels of different depths to obtain a predetermined order for said strips, securing the strips together in said order, and severing the secured strips into multi-ply blade-unit lengths.

6. A method of forming multi-ply wiper blade units for windshield cleaners, consisting of moving a plurality of rubber strips on edge and side by side in a lengthwise direction compressing said strips along one edge for temporarily securing the strips together, and severing the secured strips in lengths to form multi-ply units.

7. A method of forming multi-ply wiper blades for windshield cleaners, consisting in moving a plurality of strips on edge and side by side in a lengthwise direction, temporarily securing the strips together, severing the secured strips in lengths to form multi-ply units, and applying a holder to the unit in a manner to permanently secure the plies in their temporarily associated order.

8. A method of forming multi-ply wiper blade units for windshield cleaners, consisting in moving a plurality of strips on edge through guide means with certain portions of the strips exposed for being acted upon by a punch, subjecting said exposed portions to the action of a punch for securing the strips together, and then in severing the secured strips into lengths to form multi-ply blade units.

9. A method of forming multi-ply wiper blades for windshield cleaners, comprising the steps of associating a plurality of strips on edge in a predetermined order, temporarily securing the strips in said order to facilitate the application of a binding holder, and then in applying the holder to the temporarily secured strips in a manner to permanently secure the same in the temporarily secured associated order.

10. A machine for forming multi-ply wiper blades for windshield cleaners, comprising a guideway for feeding strips therethrough on edge, means separating the individual strips in their movements through the guideway, means for associating the strips in a predetermined order, means for temporarily securing the strips in said predetermined order, means for severing the secured strips into blade lengths, and means for applying a holder to the severed lengths to permanently secure the strips in their temporarily secured order.

11. A machine for making multi-ply wiper blades, comprising means for guiding a plurality of strips on edge in a lengthwise direction, means for temporarily securing said strips together, means for severing the secured strips in blade lengths to form multiply units, and means for punching such multiply units while in their temporarily secured order.

12. A multi-ply wiper blade making machine comprising a guideway through which a plurality of strips are moved on edge, means for associating the strips in a predetermined stepped order, means for severing the associated strips into blade lengths, and means for applying a holder to the severed lengths to secure the strips in their pre-arranged order.

13. A multi-ply wiper blade making machine comprising a plurality of strip-guiding channels of varying depths for associating fed strips in a predetermined order, means for temporarily securing the strips in such order, and means acting to sever the secured strips into a predetermined length and simultaneously perforate said severed length.

14. A multi-ply wiper blade making machine comprising a guideway through which strips are fed on edge lengthwise, gage shoulders within the guideway for supporting and associating the strips in a predetermined order, means for securing the strips in said order, and means for severing the secured strips into predetermined lengths.

15. A wiper blade making machine comprising a guideway through which strips are fed on edge, means acting on the lower edges of the strips to associate them in a predetermined order, means acting on the upper portions of the strips for securing them together, and means for severing the secured strips into predetermined lengths.

16. A wiper blade making machine comprising a guideway through which strips are fed on edge, a plurality of channels of differing depths arranged side by side for receiving the strips on edge and associating them in a predetermined order with the upper edges of the strips projecting above said channels, means for securing the strips together at their upper edges, and means for severing the secured strips into predetermined lengths.

17. A wiper blade making machine comprising a guideway through which strips are fed on edge, a plurality of channels of differing depths arranged side by side for receiving the strips on edge and associating them in a predetermined order with the upper edges of the strips projecting above said channels, a die arranged on one side of the channels adjacent the upper edges of the strips, and a punch arranged on the opposite side of the channels and coacting with the die to secure the strips together by adhesion.

18. A wiper blade making machine comprising a guideway through which strips are fed on edge, a plurality of channels of differing depths arranged side by side for receiving the strips on edge and associating them in a predetermined order with the upper edges of the strip projecting above said channels, means acting above the channels for securing the strips together at their upper edges, and means for severing the secured strips into blade lengths.

19. A wiper blade making machine comprising an associating device having shoulders in progressively stepped relation inwardly from opposite sides, means for confining a plurality of strips on edge and in engagement with the respective one of said shoulders, means for severing the pre-arranged strips into blade lengths, and means for perforating the blades while in said pre-arranged order.

20. A wiper blade making machine comprising a plurality of independent channels through which strips are fed on edge, said channels partitioned from each other with the channels progressively deepening from the outermost channels toward the centermost, and means for securing the strips in the channels in their pre-arranged order.

21. A machine for making multi-ply wiper blades, comprising gage means having a plurality of shoulders arranged in stepped order for supporting a like number of plies on edge and in side-by-side relation whereby the wiping edges of the plies will be related in a similar stepped order when a holder is secured over the opposite edges of the plies, and means for securing the plies in such stepped order.

22. A method of forming multi-ply wiper blades in which the plies are in stepped order, consisting in supporting a plurality of plies in side-by-side relation and on edge on a like number of supporting shoulders predeterminedly arranged inversely to such stepped order whereby the supported edges of the plies will assume the desired stepped order, then applying a substantially U-sectioned holder over the opposite edges of said plies, and finally in permanently securing such ply-arrangement by clamping the holder over said opposite edges of the plies.

23. A method of forming multi-ply wiper blades, consisting in providing a pre-arranged series of gage shoulders stepped progressively from opposite sides toward a central shoulder, arranging a plurality of plies of substantially equal width in side-by-side relation and seating them individually on edge against the shoulders whereby to relatively step the plies, and securing such arranged plies in a holder.

24. The method of forming multi-ply wiper blades for windshield cleaners, consisting in feeding a plurality of strips on edge in a longitudinal direction, associating the said strips whereby the wiping edges will have a predetermined stepped relation, and permanently securing the strips in such stepped relation by applying a holder over the opposite edges of said strips.

25. In a device for the manufacture of multi-ply wiper blades, gage means having a plurality of shoulders for individually supporting a like number of plies, said shoulders being progressively stepped from the outermost to the innermost thereof, whereby the wiping edges of the plies will be likewise stepped, and means for causing the plies to be adhesively secured together in such stepped order.

26. In a device for the manufacture of multi-ply wiper blades, gage means having a plurality of shoulders for individually supporting a like number of plies, said shoulders being progressively stepped from the outermost shoulders to the innermost shoulder, whereby the wipping edges of the plies will be likewise stepped and the opposite edges of the plies will be exposed for the application of a holder thereover, and means for clampingly pressing the plies together to secure them in such stepped order.

HENRY HUEBER.